W. F. FORSELL.
AUTO TIRE.
APPLICATION FILED AUG. 19, 1916.
1,246,736.
Patented Nov. 13, 1917.
2 SHEETS—SHEET 1.
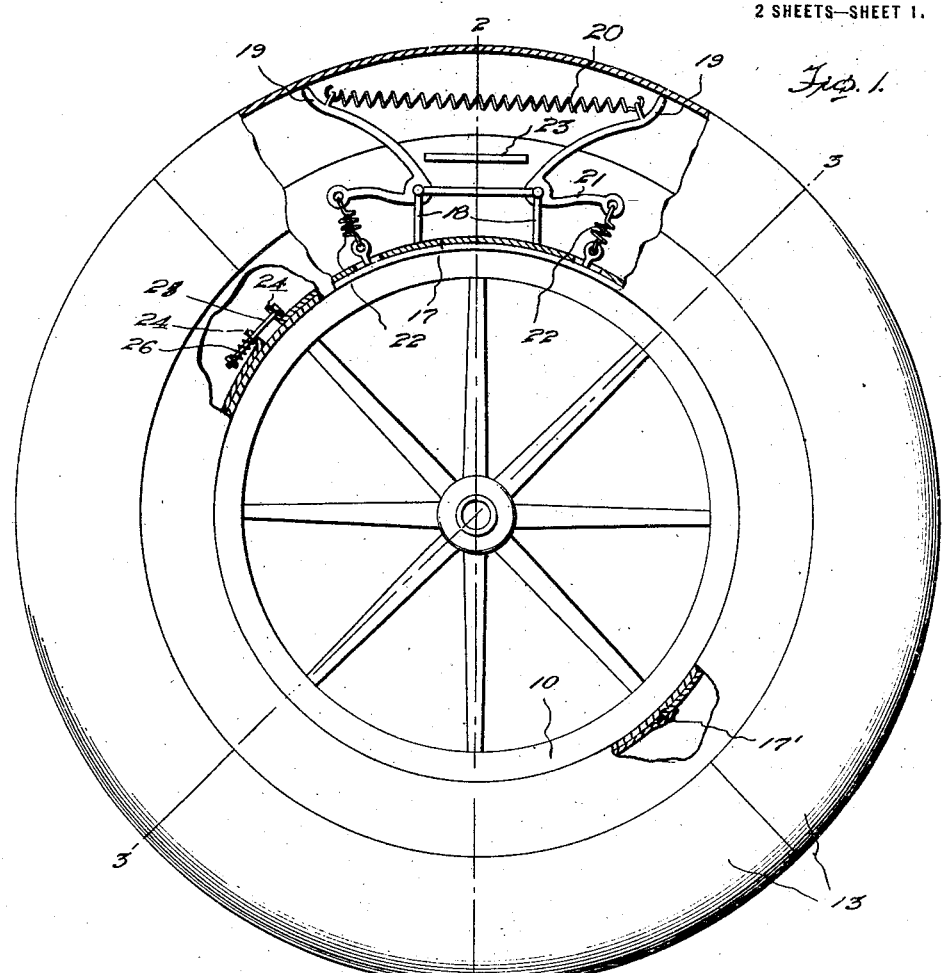
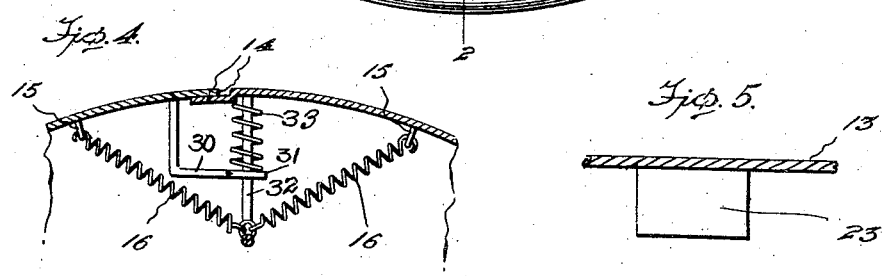
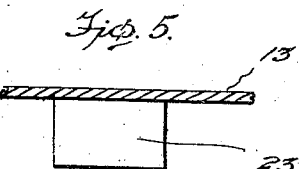
Witness
Paul M. Hunt
Inventor
Walter F. Forsell
By John Louis Waters & Co.
Attorney

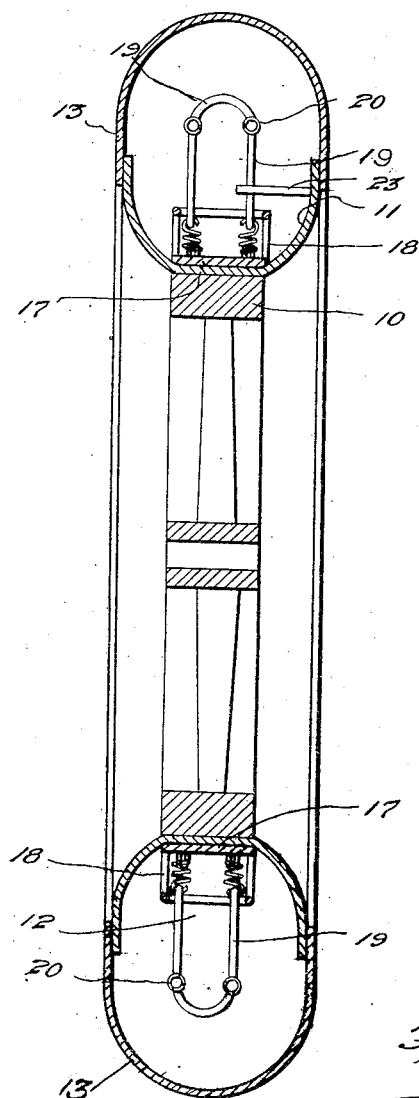
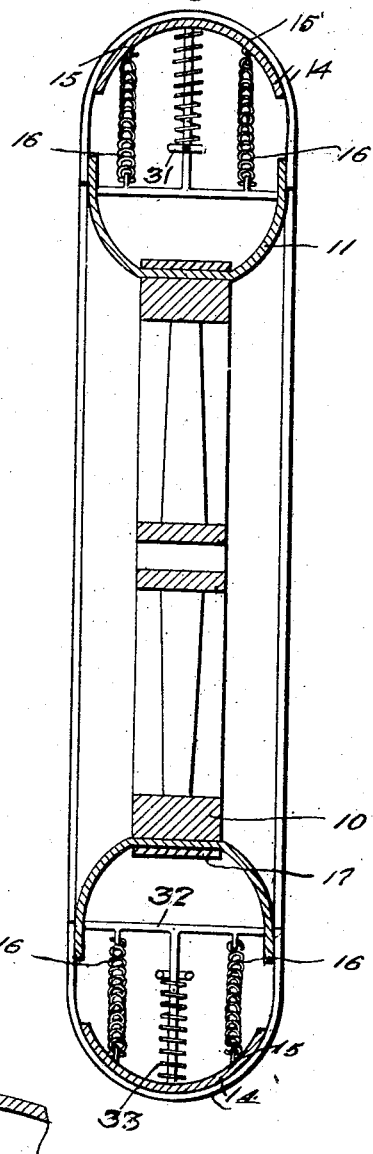
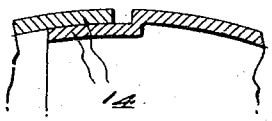

UNITED STATES PATENT OFFICE.

WALTER FRANK FORSELL, OF HUDSON, WYOMING.

AUTO-TIRE.

1,246,736.  Specification of Letters Patent.  Patented Nov. 13, 1917.

Application filed August 19, 1916.  Serial No. 115,878.

*To all whom it may concern:*

Be it known that I, WALTER F. FORSELL, a citizen of the United States, residing at Hudson, in the county of Fremont and State of Wyoming, have invented certain useful Improvements in Auto-Tires, of which the following is a specification, reference being had therein to the accompanying drawings.

This invention relates to improvements in auto tires, one object of the invention being the provision of a novel arrangement which dispenses with the use of air in tires and which provides a substitute which will permit the introduction within the tire casing of the tire, of spring controlled means which will normally hold the outer casing distended, and which at the same time will not be affected by puncture or blow out.

A further object of this invention is the provision of a simple, inexpensive and durable tire which is thoroughly efficient and practical in use.

In the accompanying drawings:

Figure 1 is a side elevation of a complete wheel equipped with the present invention, portions of the outer casing being broken away.

Fig. 2 is a cross section taken on line 2—2 of Fig. 1.

Fig. 3 is a cross section taken on line 3—3 of Fig. 1.

Fig. 4 is a detail sectional view of the meeting ends of the outer circumferential plates, showing the means for resiliently connecting the plates to permit radial movement of the same.

Fig. 5 is a fragmentary sectional view of one of the stops or limiting devices for holding the supporting levers at the limit of their distending positions.

Fig. 6 is a fragmentary enlarged section taken through the overlapping ends of the outer circumferential plates, showing the arrangement thereof to provide a smooth tread surface.

Referring to the drawings, the numeral 10 designates the rim of the wheel which has mounted thereon the inner casing 11, in which is mounted the present distending device 12 incased by a plurality of segmental sections 13 which are provided with the overlapping ends 14 which permit of the necessary circumferential movement of the member 12 within the outer casing.

Carried by each section adjacent to its overlapping end are a plurality of hooks 15 to which are connected the springs 16, such springs tending to resiliently hold the sections in coöperative relation.

It will be seen that a pair of T-shaped rods 32 are provided each having one arm extending across the sides of the inner casing and another arm attached to the inner side of one end of each section of the outer casing. L-shaped members 30 are also provided which are secured to the opposite ends of the sections of the outer casing and having relatively large eyes 31 through which the last-named arms of the rods project. Springs 33 are coiled around the last-named arms and bear respectively against the inner periphery of the outer casing sections and against the eyes of the L-shaped members. The springs 16 are secured at their inner ends to the first-named arm of each rod.

Carried by the inner sectional member or band 17 of the member 12, at equi-distant points, are the two pairs of supports 18 which have pivotally connected thereto the outer section supporting members 19, whose free ends are resiliently connected by the springs 20, while the short levers 21 are attached to the plate 17 by means of the springs 22. Thus, the springs 20 and 22 coöperate to hold the free ends of the members 19 in contact with the inner side of the outer sections 13 and thus hold the sections resiliently distended to carry the weight thrust upon the tire.

Connected between each set of the members 19 is a limiting device 23 which prevents the members 19 from moving too far toward each other, so that the sections 13 will not be forced so far apart.

It will be understood that the springs 16 and 33, the L-shaped members 30 and T-shaped members 32 are secured to the segmental sections of the outer casing before the straddling sides of these sections are bent down so as to slidably engage over the similar sides of the inner casing. This will provide an annular space above the inner casing giving access to the interior of the outer casing.

From the foregoing description, it is evident that with an outer casing distender made according to and embodying the present invention, the puncture of the outer casing will have no ill effect upon the tire as the same is distended by a spring action between the members 17 and 13.

The ends 17' of the sections of the band 17 are interlocked, while the other ends are provided with apertured lugs 24, connected together resiliently by the bolt 25 and the spring 26.

What I claim as new is:—

1. In a resilient wheel, in combination, an inner and an outer casing, each U-shaped in cross section and having slidably overlapping sides, the outer casing being composed of segmental sections, the ends of one segmental section being inset so as to be slidably overlapped by the ends of the adjacent section, a pair of T-shaped rods, each having one arm extending across the sides of the inner casing and the other arm attached to the inner side of one end of each section, L-shaped members secured to the opposite ends of the sections of the outer casing and having relatively large eyes through which the last named arms of said rods project, springs coiled around the last named arms and bearing respectively against the inner periphery of the outer casing sections and against the eyes of the L-shaped members and pairs of elongated coiled springs secured at one end to the opposite ends of the first named arm of each rod and at their opposite ends to the inner periphery of the segmental sections, and means for distending the said segmental sections.

2. In a device of the kind described, in combination, a wheel, an outer and an inner casing each substantially U-shaped in cross section and having slidably overlapping sides, the inner casing being secured upon said wheel, said outer casing adapted to move eccentrically of the inner casing, and a series of distending devices interposed between the outer and inner casings at spaced apart intervals, each distending device consisting of a pair of U-shaped supports connected in spaced relation and secured upon said wheel, a pair of eye bolts on said wheel adjacent each of said supports, pairs of bell crank levers, each having an integral loop and fulcrumed respectively upon one of said supports, short coiled springs secured to said eye bolts and to one arm of each bell crank lever, longer coiled springs secured at opposite ends to the looped portions of said levers for drawing them toward each other and in engagement with the periphery of the outer casing, and a stop arm secured to the inner casing against which either of said levers may abut so as to be limited in movement.

In testimony whereof I affix my signature.

WALTER FRANK FORSELL.

Copies of this patent may be obtained for five cents each, by addressing the "Commissioner of Patents, Washington, D. C."